May 29, 1923.
W. E. HALE
DOUBLE ACTING LOAD BRAKE
Filed April 20, 1921
1,457,162
2 Sheets-Sheet 1
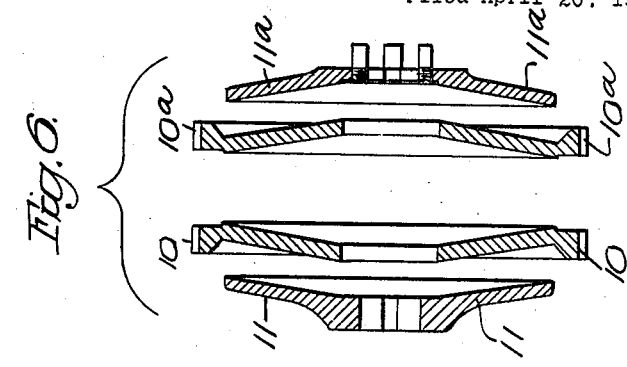
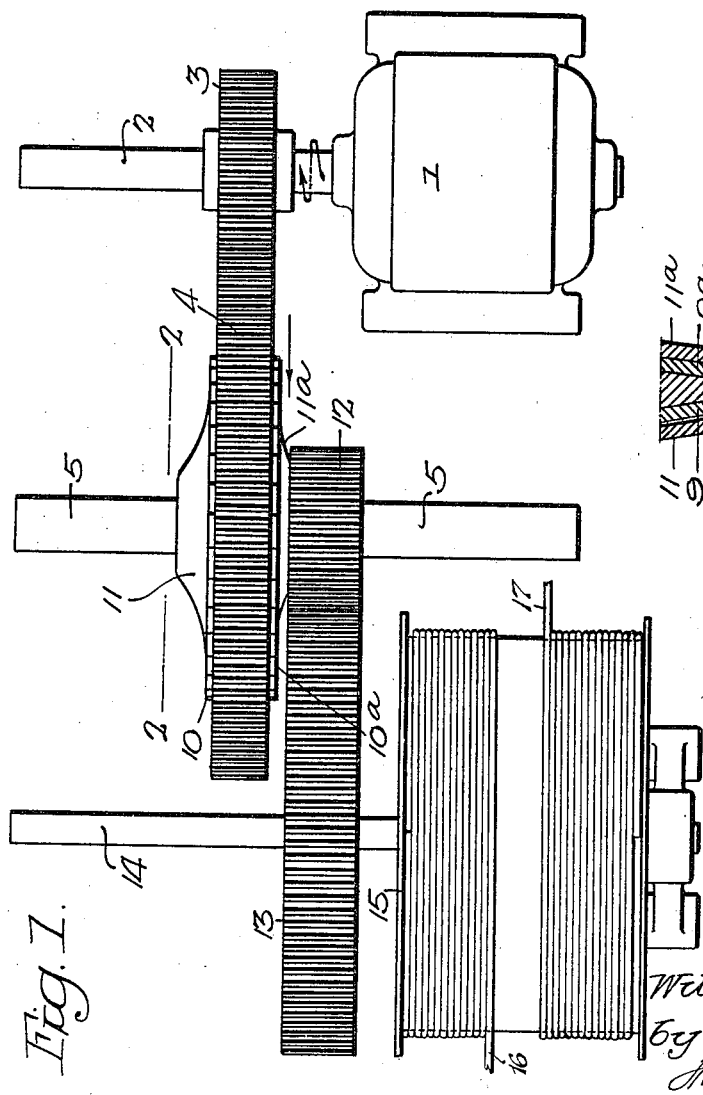
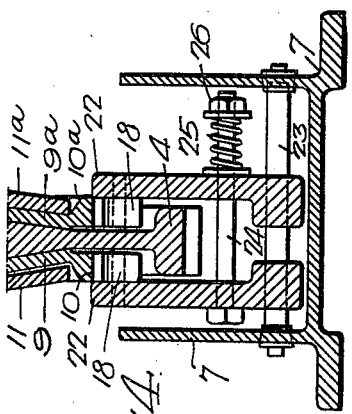
Inventor:-
William E. Hale.
by his Attorneys May 29, 1923.
W. E. HALE
DOUBLE ACTING LOAD BRAKE
Filed April 20, 1921
1,457,162
2 Sheets-Sheet 2
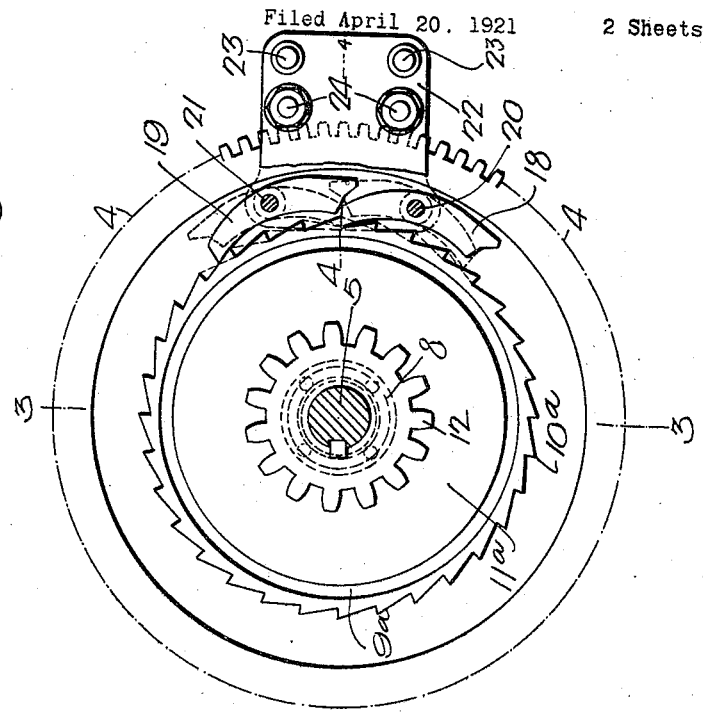
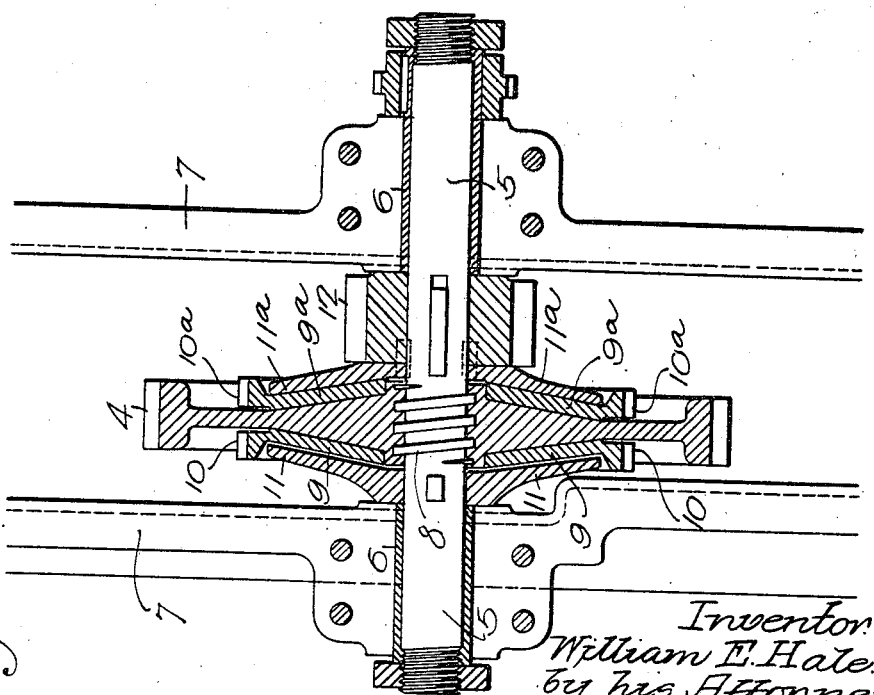
Inventor —
William E. Hale.
by his Attorneys.
Howson & Howson.

Patented May 29, 1923.

1,457,162

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

DOUBLE-ACTING LOAD BRAKE.

Application filed April 20, 1921. Serial No. 463,012.

*To all whom it may concern:*

Be it known that I, WILLIAM E. HALE, a citizen of the United States, residing in Fort Washington, Montgomery County, Pennsylvania, have invented certain Improvements in Double-Acting Load Brakes, of which the following is a specification.

My invention relates to certain improvements in hoisting mechanism, particularly of the type used in operating a skip hoist in which a bucket is raised and lowered through the medium of a drum operated by a reversible motor, or other means.

One object of the invention is to provide mechanism for preventing a heavy load from running away when being raised.

A further object of the invention is to provide means by which the friction mechanism is automatically operated, whereby the movement of the drum can be reversed on the reversal of the motor, the load being prevented from slipping during or after the shifting operation.

These objects I attain in the following manner, reference being had to the accompanying drawings, in which:

Fig. 1 is a plan view showing my improved mechanism in relation to a driving motor and a rope drum;

Fig. 2 is a sectional view on the line 2—2, Fig. 1;

Fig. 3 is a sectional view on the line 3—3, Fig. 2;

Fig. 4 is a sectional view on the line 4—4, Fig. 2;

Fig. 5 is a perspective view of one of the pawls; and

Fig. 6 is a detached sectional view of the friction disks.

1 is a motor, and, in the present instance, I have shown an electric motor. On the motor shaft 2 is a pinion 3, which meshes with the gear wheel 4 mounted on the shaft 5. This shaft is adapted to a bearing 6 in a frame 7 of any suitable construction. The shaft has screw threads 8, and, in the hub of the gear wheel 4 is an internal thread which meshes with the screw 8 so that, when the gear wheel 4 is turned in one direction, it will be moved laterally by the screw thread 8 towards one side and, when the direction of movement is reversed, it will be moved towards the opposite side. Mounted on the hub of the gear wheel 4 are two friction disks 9, 9ª. On the periphery of these disks are ratchet teeth 10 and 10ª, respectively. Secured to the shaft on each side of the gear wheel 4 are friction disks 11 and 11ª. Both of these disks are keyed to the shaft, as shown, so that they must turn the shaft when the disks 9, 9ª are in frictional contact with the friction disks and with the gear wheel 4. Also keyed to the shaft is a pinion 12, which meshes with a gear wheel 13 on a shaft 14 on which is mounted a hoisting drum 15. Two ropes 16 and 17 are coiled on this drum, one rope leading off from one side of the drum and the other rope leading off from the other side of the drum so that when a bucket, or other weight, is attached to one rope and when the mechanism is adjusted so that this bucket will be raised, the other bucket, which is in the raised position, is lowered. Engaging the ratchet teeth on the friction disk 11 are pawls 18 and 19, which are pivoted respectively at 20 and 21 to blocks 22, which are mounted on rods 23, 23 carried by the frame 7, Fig. 4, and they are connected by bolts 24 on which are springs 25, tending to draw the two blocks towards each other. The pressure can be regulated by adjusting the nuts on the rod. In the present instance, there are two pawls at each side of the wheel and both sets of pawls are in engagement at all times with their respective disks.

The operation is as follows: When it is wished to raise a bucket attached to one rope, then the motor 1 is turned in the direction of the arrow, Fig. 1. This movement will cause the gear wheel 4 to move in the direction of its arrow and the screw thread 8 will force this wheel in contact with the ratchet disk 9ª and towards the friction disk 11ª, and, as the wheel continues to revolve, the pressure will be sufficient to cause the friction disk to be turned and with it the shaft 5. As the pinion 12 is secured to this shaft, it will turn the drum and will wind one rope, while the other is being unwound. When the motor is reversed, the motor shaft 2 is turned in the opposite direction and the gear wheel 4 is withdrawn from contact with the ratchet disk 9ª and friction disk 11ª and moved towards the ratchet disk 9 and friction disk 11. When sufficient pressure is exerted, the friction disk 11 will be turned with the gear wheel 4 and will turn the shaft 5 in the direction opposite to that previously described, and the frictional movement of the drum will be reversed. While the gear wheel 4 can be turned in either direction, the ratchet disk 10 can only turn in one direction, due to the pawls engaging the teeth of the ratchet disk, and the other ratchet disk 9ª can only turn in the opposite direction to the disk 9, owing to the engagement of its teeth by the pawls.

If the load should rotate the gear wheel 12, the gear wheel will turn the shaft, and its screw will cause the gear wheel 4 to force either the friction disk 10 or 10ª against the friction disks 11, 11ª, and, as the pawl holds the disks 10, 10ª from rotating in one direction, the load is prevented from running away with the mechanism.

It will be understood that in some instances toothed chains and sprocket wheels may be substituted for the gear wheel shown.

I claim:

1. The combination in hoisting mechanism, of a power shaft; an intermediate shaft; a driven shaft; a drum thereon arranged to have two ropes wound thereon, one leading from one side of the drum and the other leading from the opposite side thereof; an intermediate shaft having a screw thread; a wheel on the said shaft driven from the power shaft and having an internal thread in its hub meshing with the thread on the intermediate shaft; two friction disks keyed to the said shaft, one on each side of the wheel; ratchet disks on each side of the wheel located between the wheel and the friction disks; pawls engaging the ratchet disks so that one disk will turn in one direction only and the other disk will turn in the opposite direction only so that when the wheel is turned in one direction it will move into frictional contact with the disks on one side of the wheel, turning the shaft in one direction and, when the rotation of the wheel is reversed, it will be moved into frictional contact with the other disks, causing the shaft to move in the opposite direction; and means connecting the shaft with the drum shaft so that the drum shaft will be reversed with the intermediate shaft, the pawls preventing the load running away with the mechanism.

2. The combination of a power shaft; a drum shaft; a drum thereon; an intermediate shaft; a gear through which the drum shaft is driven from the intermediate shaft; a pinion on the power shaft; a gear wheel on the intermediate shaft; said intermediate shaft having a screw thread thereon, a hub of the gear wheel having a thread meshing with the thread of the intermediate shaft; two friction disks, one on each side of the said gear wheel, said disks being secured to the intermediate shaft; a ratchet disk loosely mounted between the gear wheel and each friction disk and having ratchet teeth thereon; pawls engaging the ratchet teeth, the teeth of one ratchet disk being set opposite to the teeth of the other ratchet disk and in such relation to the movement of the gear wheel that when the said gear wheel is turned in one direction it will be moved towards one friction disk and will turn the shaft through said disk; and pawls preventing the shaft turning in the opposite direction in order to prevent the racing of the shaft, due to excessive load.

WILLIAM E. HALE.